(12) United States Patent
Ichimi

(10) Patent No.: US 6,865,687 B1
(45) Date of Patent: Mar. 8, 2005

(54) COMMUNICATION CONTROL DEVICE

(75) Inventor: Masahiro Ichimi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/506,814

(22) Filed: Feb. 18, 2000

(30) Foreign Application Priority Data

Mar. 12, 1999 (JP) .......................................... 11-066589

(51) Int. Cl.[7] .............................................. H02H 8/05
(52) U.S. Cl. ................................. 714/2; 714/4; 714/38; 709/230
(58) Field of Search ........................... 714/2, 4, 43, 56, 714/38; 709/230

(56) References Cited

U.S. PATENT DOCUMENTS

| | | | | |
|---|---|---|---|---|
| 5,859,959 A | * | 1/1999 | Kimball et al. ................. | 714/4 |
| 6,047,222 A | * | 4/2000 | Burns et al. ................... | 700/79 |
| 6,049,825 A | * | 4/2000 | Yamamoto .................. | 709/221 |
| 6,061,746 A | * | 5/2000 | Stanley et al. ................ | 710/10 |
| 6,477,139 B1 | * | 11/2002 | Anderson et al. ........... | 370/216 |

FOREIGN PATENT DOCUMENTS

| | | |
|---|---|---|
| JP | 60-37054 | 2/1985 |
| JP | 64-47154 | 2/1989 |
| JP | 5-289789 | 11/1993 |

* cited by examiner

*Primary Examiner*—Robert Beausoliel
*Assistant Examiner*—Yolanda L Wilson
(74) *Attorney, Agent, or Firm*—Staas & Halsey LLP

(57) ABSTRACT

Disclosed is a communication control device whose configuration is capable of being changed flexibly without being affected by a computer's internal bus specifications, etc. Externally to the computer, a plurality of communication adapters are connected to a serial bus. This serial bus is compliant with the USB or the IEEE 1394 standard. A program for implementing part of protocol layer functions is downloaded from the computer to each communication adapter. The computer, using an application, implements the function of an upper layer in the protocol layer stack, and the adapters each implement part of the protocol layer functions using the downloaded program, and together they support a communication protocol.

8 Claims, 8 Drawing Sheets

COMMUNICATION CONTROL DEVICE

BACKGROUND OF THE INVENTION

1. Field of the Invention

The present invention relates to a communication control device which controls communication performed over a communication line.

2. Description of the Related Art

Traditionally, input/output devices (each hereinafter called an I/O device) such as communication control devices connected to a computer have had be designed to match the system bus internal to the computer, and a change in the system bus architecture has required an overall change in the design of the I/O devices.

Further, when the system configuration is fixed, if the system is to be constructed in a dual configuration for enhanced reliability, a large-scale configuration has had to be employed, requiring, for example, complete duplication of the computer itself.

On the other hand, in the field of personal computers (PCs), USB (Universal Serial Bus) and IEEE 1394 have been standardized in recent years as interface standards for interfacing peripheral devices to personal computers. These are next-generation serial interfaces that are expected to replace the traditional RS232C, and support "Hot Plug In", "Plug and Play", "Isochronous Transfer", etc.

"Hot Plug In" is a function that enables a device to be connected without having to turn the system off, while "Plug and Play" is a function by which a device is just connected to a personal computer and is automatically configured to be ready for use without going through cumbersome installation procedures. Further, isochronous transfer makes possible, for example, the transmission of audio and video signals that cannot tolerate dropouts, by guaranteeing transmission bandwidth and giving higher data transmission priority.

SUMMARY OF THE INVENTION

The present invention has been devised in view of the advent of the above-mentioned next-generation serial interfaces, and an object of the invention is to provide a communication control device which comprises a plurality of communication adapters connected to a serial bus as an external bus, and whose configuration is capable of being changed flexibly without being affected by computer internal bus specifications, etc.

To achieve the above object, according to the present invention, there is provided a communication control device comprising: a plurality of layer control devices, each implementing part of protocol layer functions and together supporting a communication protocol; and a transmission line for interconnecting the plurality of layer control devices to enable data communication between the layer control devices.

Preferably, according to the present invention, there are provided a plurality of physical layer control devices, each implementing the function of a different physical layer, and one of the physical layer control devices is dynamically selected when performing communication.

Also preferably, according to the present invention, a physical layer control device for implementing the function of a physical layer is provided which is duplicated by another physical layer control device, and in the event of a failure of one physical layer control device, the other physical layer control device is switched in for operation.

Also preferably, according to the present invention, a program necessary for the operation of each of the layer control devices is downloaded to the corresponding layer control device.

Preferably, according to the present invention, the transmission line is a serial bus.

Preferably, according to the present invention, the serial bus is compliant with the USB standard.

Also preferably, according to the present invention, the serial bus is compliant with the IEEE 1394 standard.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Embodiments of the present invention will be described below with reference to the accompanying drawings.

Figure 1:
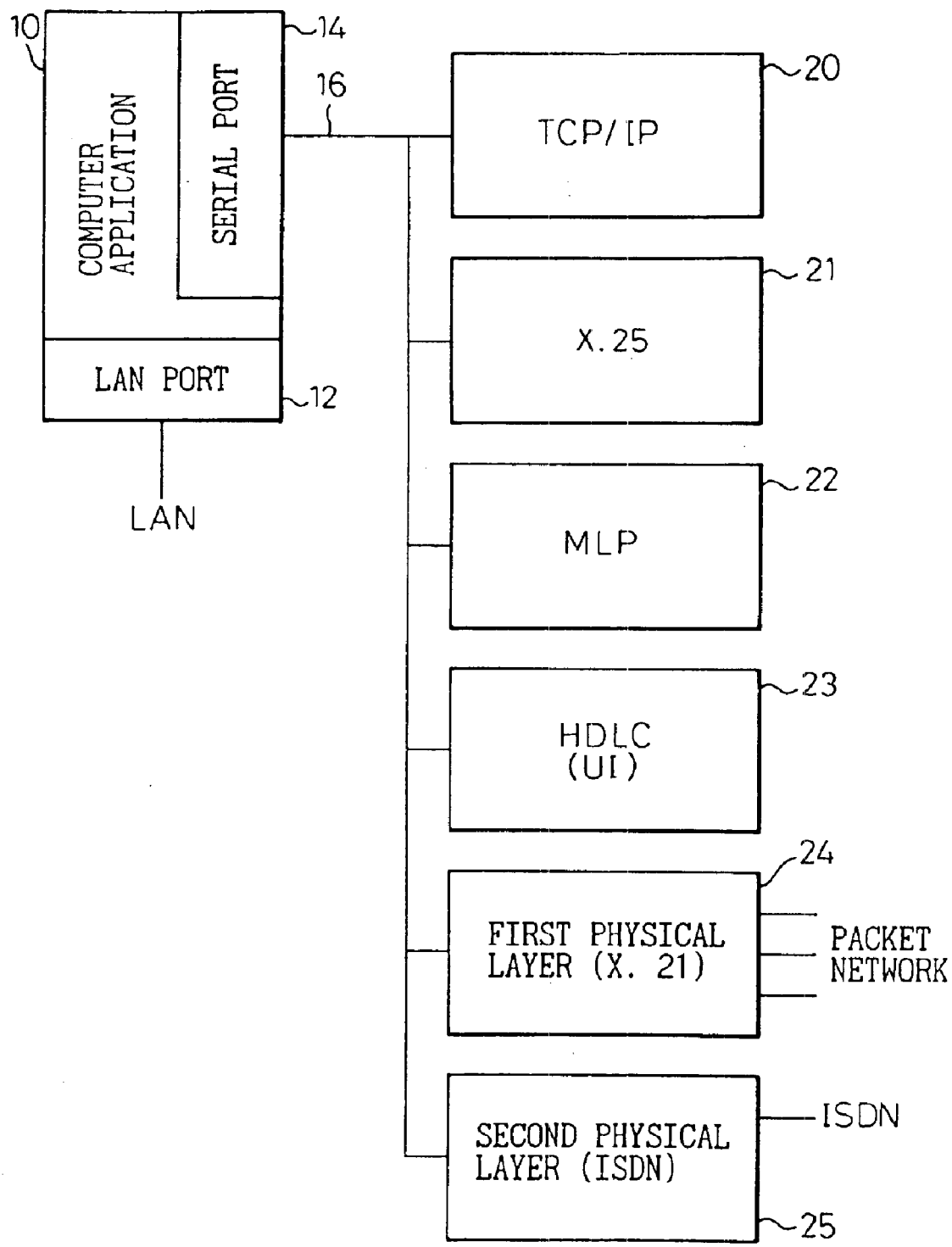
FIG. 1 is a block diagram showing the configuration of one embodiment of a communication control device according to the present invention.

FIG. 1 is a block diagram showing the configuration of one embodiment of a communication control device according to the present invention. A computer 10 is equipped with a LAN port 12 used for communication over a local area network (LAN) and a serial port 14 used for connecting a serial bus 16 that complies with the USB or the IEEE 1394 standard.

Externally to the computer 10, communication adapters 20, 21, 22, 23, 24, and 25 are connected to the serial bus 16. These communication adapters can be classified into the following two categories. That is, the communication adapters 20, 21, 22, and 23 are each provided with an MPU (Micro Processing Unit), a memory, and a serial bus controller. On the other hand, the communication adapters 24 and 25 are each provided with a media controller in addition to an MPU, a memory, and a serial bus controller.

Generally, in the case of USB, devices are connected in a tree configuration with a host at its center, and each device is controlled via the host and cannot by itself exchange data with the other devices. On the other hand, in the case of IEEE 1394, both daisy chained and tree connections are possible; there is no host-device relationship, and so-called peer-to-peer communication can be realized.

In the system configuration shown in FIG. 1, when USB is used, two serial buses are provided since there is a host-device relationship, each communication adapter acting as a device with respect to the computer and as a host or a device with respect to the other adapters.

Figure 2:
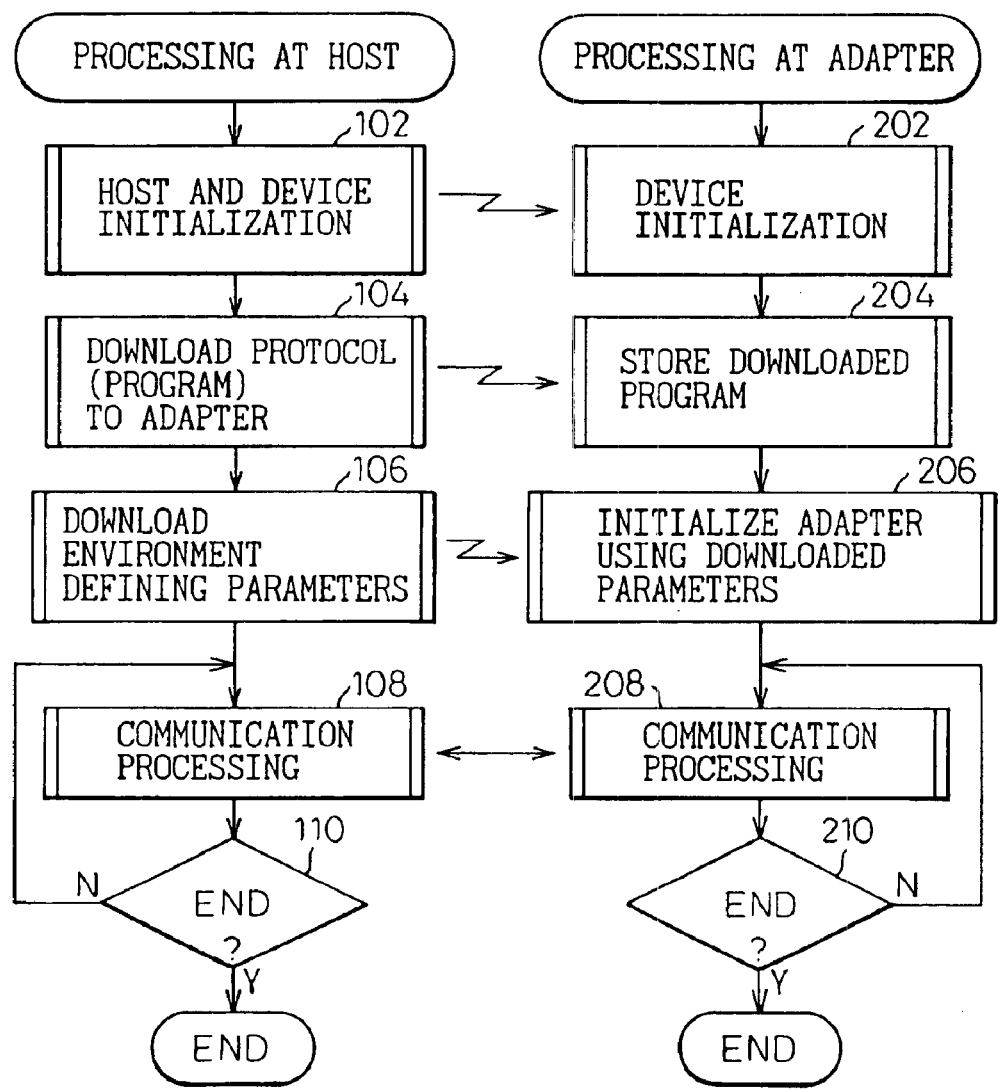
FIG. 2 is a flowchart for explaining the operation of a computer and each communication adapter.

FIG. 2 is a flowchart for explaining the operation of the computer 10 (host) and each communication adapter (device). The example described here specifically assumes the case of USB. First, when the system is powered up, the host initializes itself, while also performing control for the initialization of each device (step 102). In response to the control of the host, each adapter performs initialization (step 202). This initialization includes the initialization of the serial bus controller (i.e., the general initialization of the USB ports), the setting of the host-device relationship, the setting of the physical identifier (PID) of the device, etc.

Next, a program for implementing part of protocol layer functions is downloaded from the host to each adapter (step 104). By storing the program thus downloaded from the host into the memory, the adapter can act as a layer control device for implementing part of the protocol layer functions (step 204). The program downloading to each adapter is done to install the corresponding protocol program into the corresponding device based on the user defined environment.

As the result of the download, the adapter 20 acts, for example, as a layer control device for implementing the function of the protocol layer of TCP/IP Transmission Control Protocol/Internet Protocol), the adapter 21 as a layer control device for X.25, the adapter 22 as a layer control device for MLP for supporting multi-link connections, the adapter 23 as a layer control device for UI (Unnumbered Information), a format in HDLC (High level Data Link Control), the adapter 24 as a layer control device for X.21 as a first physical layer, and the adapter 25 as a layer control device for ISDN as a second physical layer, as shown in FIG. 1. On the other hand, the computer 10, the host, becomes a layer control device for implementing the function of an upper layer in the protocol layer stack using an application program stored in its main memory.

Next, environment defining parameters which provide the initial values necessary for the operation of the respective protocol layers are downloaded from the host to the respective adapters (step 106). On the other hand, each adapter performs initialization, such as the initialization of communication buffer management, operating communication ports, etc., based on the environment defining parameters downloaded from the host (step 206).

In this way, the computer 10 and the communication adapters 20, 21, 22, 23, 24, and 25 are configured as a communication control device comprising a plurality of layer control devices and together supporting a communication protocol, the communication control device thus being readied to process communications. With each device controlling its associated protocol layer, various kinds of communication processing are performed (steps 108 and 208). This communication processing continues until an end instruction is detected (steps 110 and 210).

The communication processing performed in steps 108 and 208 will be described in detail below. First, the transmit operation is initiated when the application program stored in the computer 10, the host, for implementing the upper layer in the protocol layer stack, is activated.

Supposing, for example, that in the definition of the environment, the protocol stack is defined as consisting of (1) Application
(2) TCP/IP
(3) HDLC (UI)
(4) Physical layer (ISDN)

from the upper to lower layers in this order, the application in the computer 10 sends out data via the serial bus 16 to the communication adapter 20 which supports TCP/IP. Next, the communication adapter 20, after processing the received data, passes the processed data via the serial bus 16 to the communication adapter 23 which supports HDLC (UI). The communication adapter 23, after processing the received data, passes the processed data via the serial bus 16 to the communication adapter 25 which supports the physical layer (ISDN). Finally, the communication adapter 25, after processing the received data, sends out the processed data onto the ISDN.

In the receive operation, the above process is reversed, that is, data is processed in the order of the communication adapter 25 that supports the physical layer (ISDN), the communication adapter 23 that supports UI, the communication adapter 20 that supports TCP/IP, and the computer 10 that stores the application.

On the other hand, when the protocol stack is defined as comprising (1) Application
(2) TCP/IP
(3) X.25
(4) MLP
(5) HDLC (UI)
(6) Physical layer (X.21)

from the upper to lower layers in this order, the communication adapters supporting the respective protocol layers perform the respectively assigned processing tasks in sequence; in this case, communication can be performed over a packet network connected to the communication adapter 24 that supports X.21 as the first physical layer.

In this way, since the respective protocol layers are assigned to the respective communication adapters interconnected via the common serial interface, a communication control device can be achieved that is virtually unaffected by the bus control or system changes of the computer. Furthermore, dynamic selection of a physical layer, that is, a physical medium, becomes possible.

As noted previously, in the case of the USB, there is a host-device relationship, and peer-to-peer communication between the communication adapters, therefore, cannot be realized. In view of this, configurations using the USB will be described in further detail based on the embodiments shown in FIGS. 3 and 4.

Figure 3:
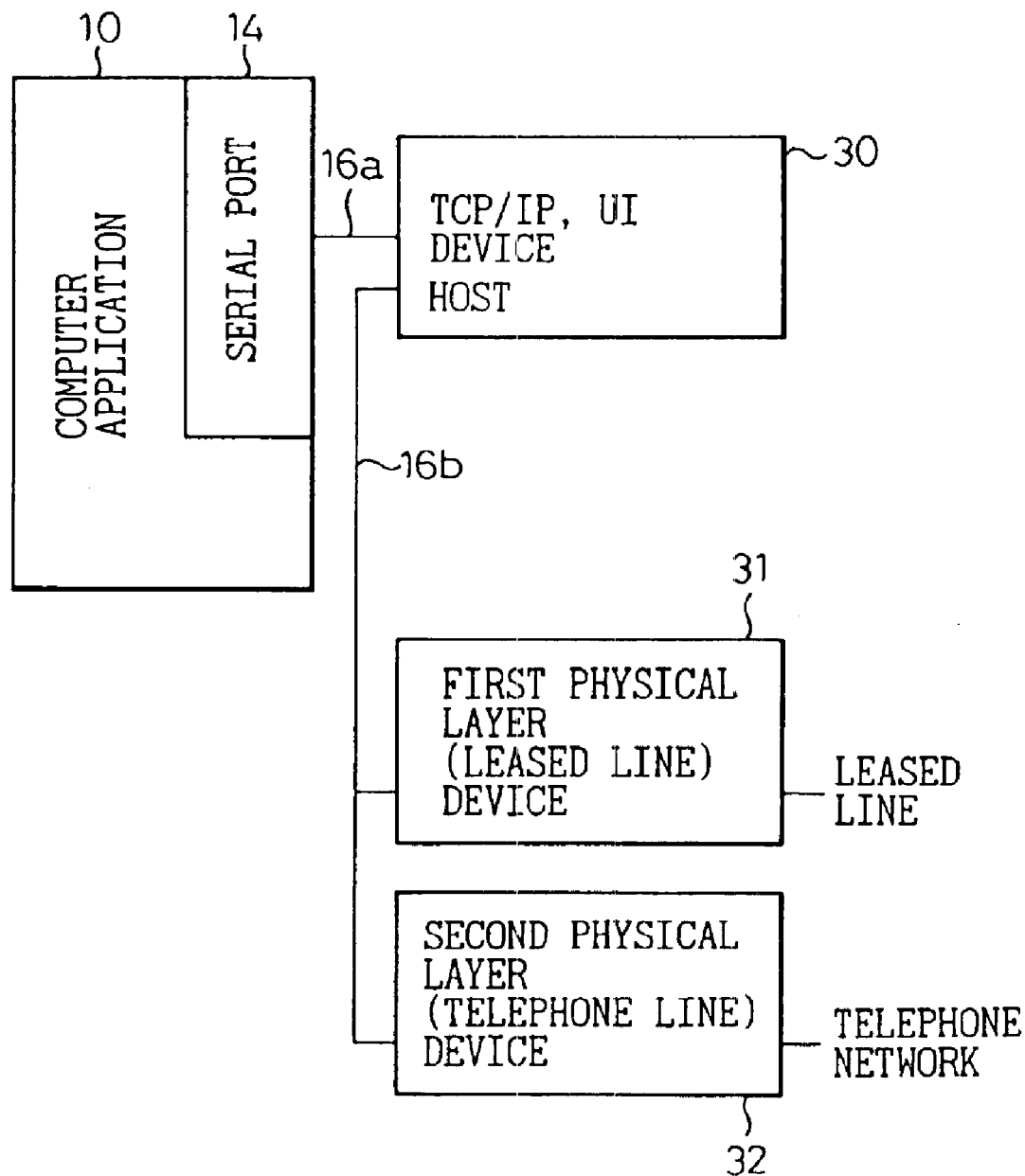
FIG. 3 is a block diagram for explaining in further detail an embodiment that uses USB.

In FIG. 3, the application in the computer 10 as a host exchanges data with a communication adapter 30 that supports TCP/IP and UI, via a serial bus 16a connected to the serial port 14. Here, the communication adapter 30 supports both the function of the communication adapter 20 and the function of the communication adapter 23 in FIG. 1. The communication adapter 30, based on the initially set definition, selects one of two communication lines, a leased line connected to a communication adapter 31 as a first physical layer or a telephone network connected to a communication adapter 32 as a second physical layer. Then, the communication adapter 30 performs communication in a host capacity with the communication adapter 31 or 32 associated with the selected communication line, via a serial bus 16b connected to a serial port provided on the communication adapter 30.

Figure 4:
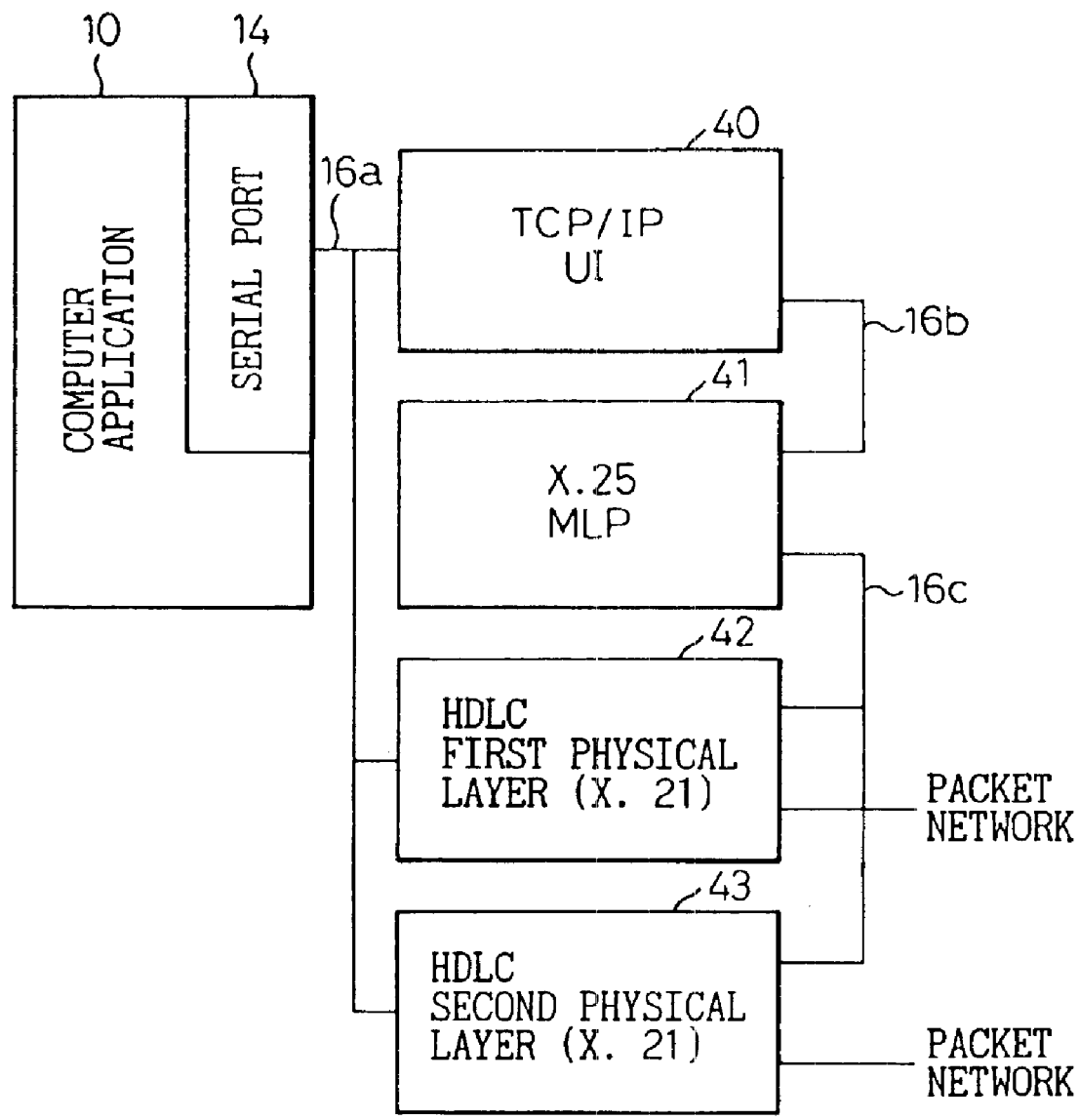
FIG. 4 is another block diagram for explaining in further detail an embodiment that uses USB.

In the embodiment shown in FIG. 4, a communication adapter 40 supports TCP/IP and UI, a communication adapter 41 supports X.25 and MLP, a communication adapter 42 supports HDLC and a first physical layer for a leased line, and a communication adapter 43 supports HDLC and a second physical layer for X.21. Based on the definition, the MLP selects the communication line to be used and, in a host capacity, accesses HDLC and other communication line resources in the communication adapter 42 or 43 via an external serial bus 16c. The MLP protocol is thus realized by the plurality of communication adapters 40, 41, 42, and 43 connected to the external serial buses 16a, 16b, and 16c.

Next, referring to the block diagram of FIG. 5, a description will be given of an embodiment that achieves increased fault tolerance by duplication of communication adapters connected on a serial bus.

When the computer 10 initializes communication adapters 50, 51, 52, and 53, the communication adapter 50 for implementing the functions of TCP/IP and UI selects, based on the definition and using a line selector 51, either the first physical layer 52 or the second physical layer 53 for connection to the telephone network. Suppose, for example, that the first physical layer 52 is connected to the telephone network.

Then, the communication is performed by going down the protocol stack (1) Application
(2) TCP/IP, UI
(3) First physical layer Here, if the first physical layer 52 is rendered unable to respond or unable to operate reliably because of a hard failure, the communication adapter 50 for implementing the functions of TCP/IP and UI switches the physical layer connected to the telephone network from the first physical layer 52 to the second physical layer 53 by means of the line selector 51, thereby allowing the communication to continue.

As described above, in the embodiment shown in FIG. 5, duplication of communication adapters can be easily accomplished for increased fault tolerance, independently of the OS (Operating System), the system bus, etc. of the computer.

Figure 5:
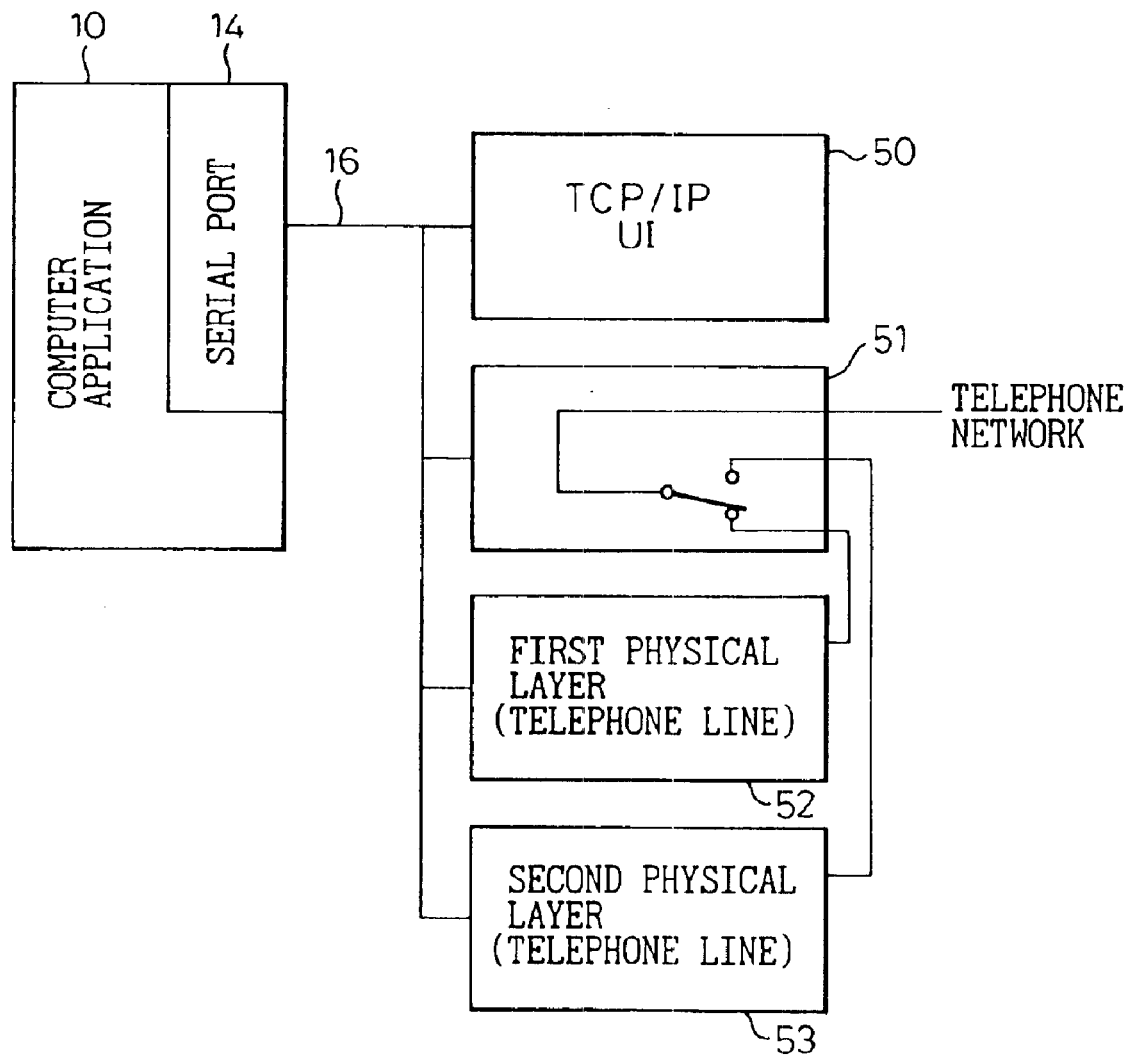
FIG. 5 is a block diagram for explaining an embodiment that achieves increased fault tolerance by duplication of communication adapters.
Figure 6:
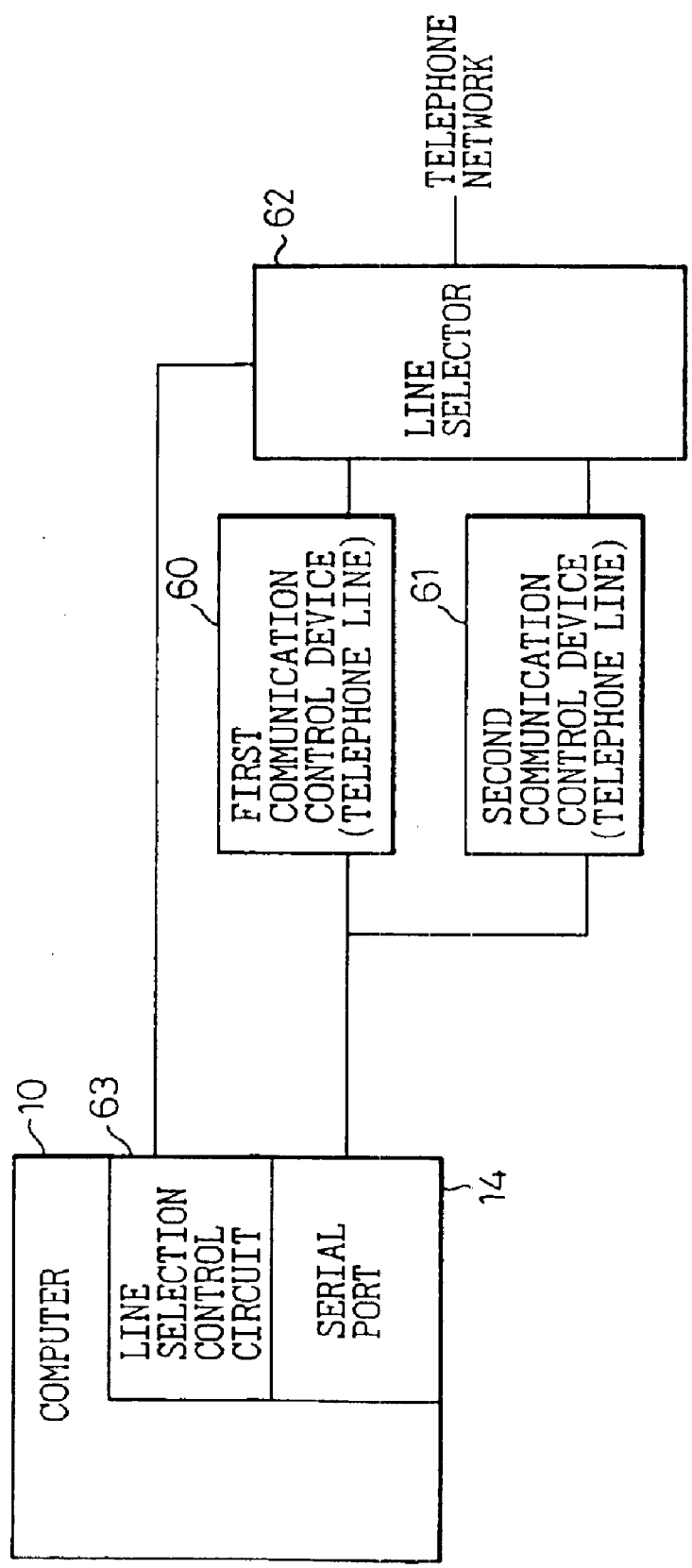
FIG. 6 is a block diagram for explaining another embodiment relating to the duplication of communication adapters.

While, in the embodiment shown in FIG. 5, the line selector as a part of the communication control device is inserted on the serial bus, it will be noted that the duplication can also be accomplished by the configuration shown in FIG. 6.

In FIG. 6, communication is usually performed using a first communication control device 60. If a failure is detected in the first communication control device 60 during communication, the computer 10 causes a line selection control circuit 63 incorporated therein to send an instruction to a line selector 62 to switch the communication control device connected to the telephone network from the first communication control device 60 to a second communication control device 61. The first and second communication control devices are shown here as representing the layers higher than the physical layer for simplicity.

Figure 7:
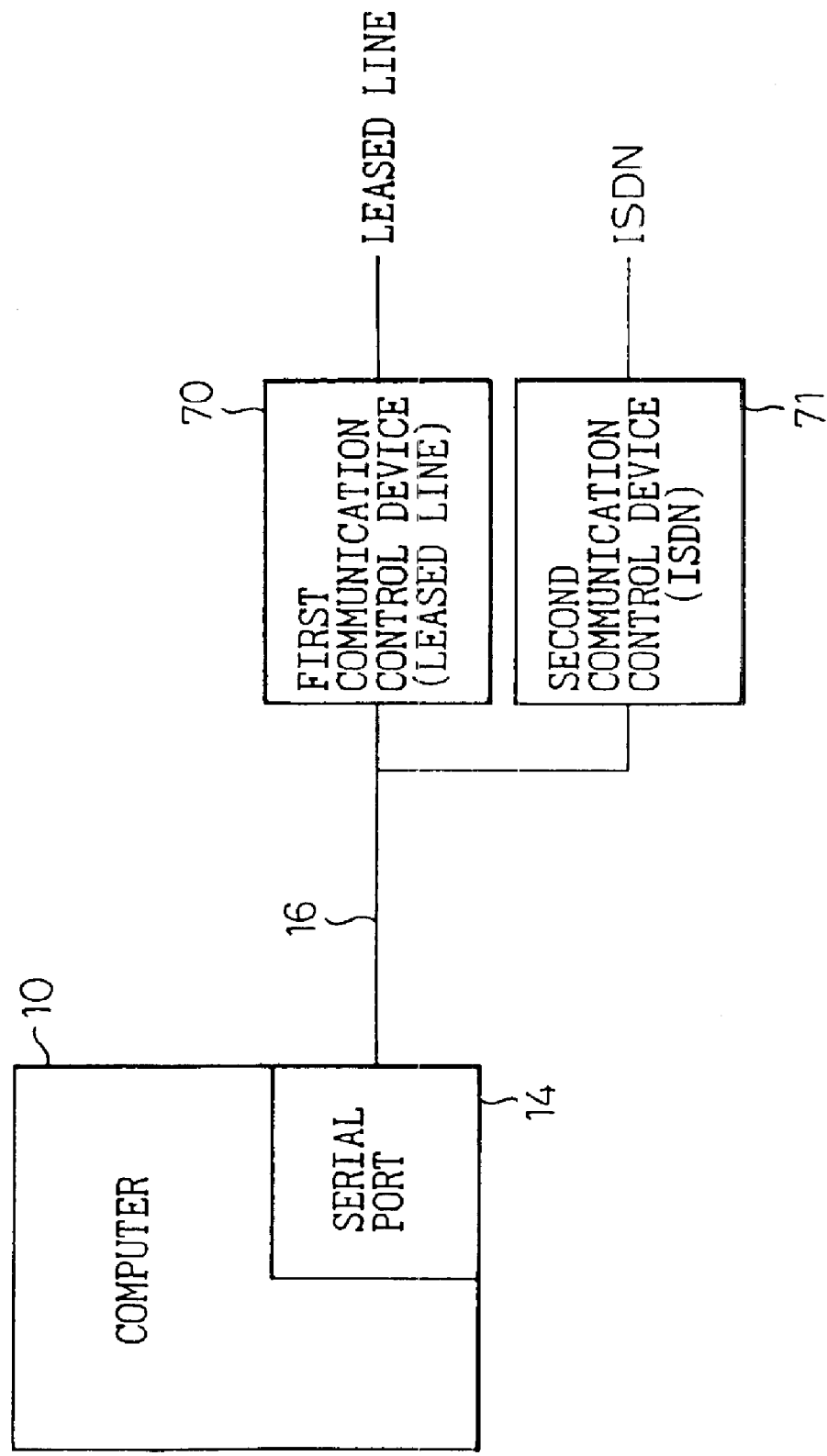
FIG. 7 is a block diagram for explaining another embodiment which performs a dynamic selection of a physical medium.

Next, another embodiment which performs a dynamic selection of a physical medium will be described with reference to FIG. 7. In FIG. 7, communication is usually performed using a first communication control device 70 connected to the serial bus 16, that is, the communication control device that supports the physical layer for a leased line.

If a failure of a communication adapter or trouble on the transmission line is detected during communication or in a diagnostic test, the computer 10 switches in a second communication control device 71 and selects the ISDN as a backup communication line to restore the communication service. At the remote end which also has the same system configuration, the communication control device that received data over the ISDN reports the status to its host computer, and when a permit is issued from the computer after checking, communication over the ISDN is started.

At the same time, the first communication control device 70, in which a failure was detected, and the corresponding communication device at the remote end move to a diagnostic mode, and communication is started in the diagnostic mode to check hardware replacement and the restoration of the transmission line; if it is confirmed that normal communication is possible as the result of a diagnosis repeated within a specified period, the respective communication control devices notifies the respective host computers accordingly. The system is thus restored by resuming communication over the leased line.

Figure 8:
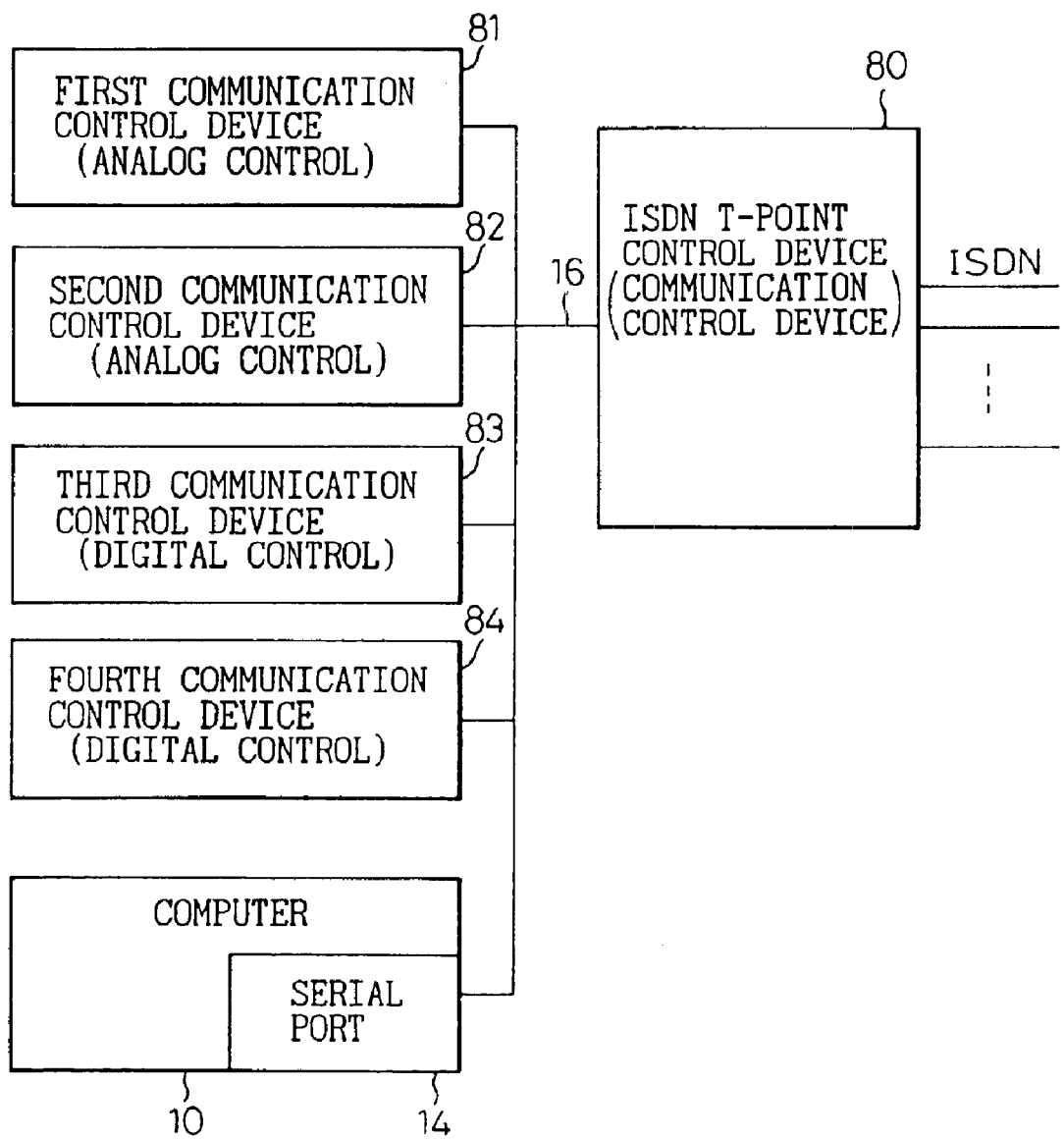
FIG. 8 is a block diagram for explaining still another embodiment which performs a dynamic selection of a physical medium.

FIG. 8 is a block diagram for explaining still another embodiment that performs a dynamic selection of a physical medium. When data is received, an ISDN T-point control device 80 (this is also a communication control device) checks whether the data is analog data or digital data, and sends out the data onto the serial bus 16 after appending an identifier and address to it.

Four communication control devices 81, 82, 83, and 84 are provided: the first and second communication control devices 81 and 82 support communication of analog data, while the third and fourth communication control devices 83 and 84 support communication of digital data. Of these communication control devices 81, 82, 83, and 84, the communication control device having at least either the specified identifier (analog or digital) or the specified address receives the data, performs the necessary processing, and after processing, transfers the data to the computer 10 via the serial bus 16.

The transmit operation is the reverse of the above receive operation. The number of digital communication control devices and the number of analog communication control devices to be installed can be selected in accordance with the number of communication channels and the system configuration.

As described above, according to the present invention, there is provided a communication control device which comprises a plurality of communication adapters connected to a serial bus as an external bus, and whose configuration is capable of being changed flexibly without being affected by internal computer bus specifications, etc.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A communication control device comprising:
   a plurality of layer control devices, each implementing part of protocol layer functions and together supporting a communication protocol; and
   a transmission line interconnecting the plurality of layer control devices to enable data communication between the layer control devices,
   wherein the communication control device dynamically assigns the part of the protocol layer functions to each of the layer control devices, and
   wherein the layer control devices supporting the respective part of the protocol layer functions perform respectively assigned processing tasks in sequence.

2. A communication control device, as claimed in claim 1, wherein a plurality of physical layer control devices are provided, each implementing the function of a different physical layer, and one of said physical layer control devices is dynamically selected when performing communication.

3. A communication control device, as claimed in claim 1, wherein a physical layer control device for implementing the function of a physical layer is provided which is duplicated by another physical layer control device, and in the event of a failure of one physical layer control device, the other physical layer control device is switched in for operation.

4. A communication control device as claimed in claim 1, wherein a program necessary for the operation of each of said layer control devices is downloaded to said each layer control device.

5. A communication control device as claimed in claim 1, wherein said transmission line is a serial bus.

6. A communication control device as claimed in claim 5, wherein said serial bus is compliant with the USB standard.

7. A communication control device as claimed in claim 5, wherein said serial bus is compliant with the IEEE 1394 standard.

8. A method of controlling communications using a plurality of layer control devices and a transmission line, the method comprising:

dividing a communication protocol into protocol layers;

dynamically assigning the protocol layers to the respective layer control devices;

interconnecting the layer control devices using the transmission line, the layer control devices communicating with one another over the transmission line; and performing operations of the assigned protocol layer, by the layer control devices, in sequence.

* * * * *

UNITED STATES PATENT AND TRADEMARK OFFICE
CERTIFICATE OF CORRECTION

PATENT NO. : 6,865,687 B1
APPLICATION NO. : 09/506814
DATED : March 8, 2005
INVENTOR(S) : Masahiro Ichimi It is certified that error appears in the above-identified patent and that said Letters Patent is hereby corrected as shown below:

Title Page,    Item [56] References Cited
FOREIGN PATENT DOCUMENTS
ADD --CA  11-328,929  4/1995
JP  3-501072  3/1991--.

Signed and Sealed this

Nineteenth Day of September, 2006

JON W. DUDAS
*Director of the United States Patent and Trademark Office*